UNITED STATES PATENT OFFICE 2,018,213

4-ALKYL- AND 4-ARALKYL-DIHYDRO-RESORCINOLS AND PROCESS FOR THE MANUFACTURE OF SAME

Max Klingenfuss, Basel, Switzerland, assignor to Hoffmann-La Roche Inc., Nutley, N. J., a corporation of New Jersey No Drawing. Application December 21, 1934, Serial No. 758,705. In Germany January 20, 1934

25 Claims. (Cl. 260—131)

According to the process of United States Patent No. 1,965,499 resorcinol is converted in the simplest manner and with an almost theoretical yield into dihydro-resorcinol by subjecting resorcinol in the presence of at least one gram equivalent weight of a strongly basic compound per gram molecular weight of resorcinol to catalytic hydrogenation.

It has now been found that this process is excellently suited also for the conversion of the 4-R-resorcinols (R representing an alkyl or an aralkyl group) into the corresponding dihydroresorcinols. Metals of the 8th group of the periodical system may be used as catalysts. This method is particularly valuable for preparing the 4-alkyl- and -aralkyl-derivatives, because the 4-alkyl-resorcinols are easily obtained by the general method described by Clemmensen (Berichte der Deutschen Chemischen Gesellschaft, vol. 46, 1913, page 1837), whereas the synthetic methods known heretofore principally yield cyclo-hexandione derivatives with the substituents in 5-position (Liebigs Annalen der Chemie, vol. 294, 1897, page 255–256).

According to the process of German Patent No. 571,972 phenols may also be subjected to catalytic hydrogenation in the form of their alkali salts, but in this case 6 hydrogen atoms are taken up and the alkali-insoluble cyclo-hexanoles are formed. If a second substituent is present in the nucleus in addition to the phenolic hydroxyl, the formation of the transisomeric hexahydrophenols is favoured. By hydrogenating the alkyl-resorcinols in the presence of compounds of strongly alkaline reaction, alkali-soluble cyclohexandiones are obtained, the reaction being terminated after absorption of but two hydrogen atoms. Moreover the required temperature is at least 100° C. lower than the temperature mentioned in the said patent.

The products of this process are very reactive compounds. They are to be used as intermediates for obtaining pharmaceutical preparations.

*Example 1*

214 parts by weight of 2,4-dihydroxy-diphenyl-ethane (4-phenyl-ethyl-resorcinol) and 40 parts by weight of sodium hydroxide are dissolved in 700 parts by weight of water. After the addition of 5 parts by weight of a nickel catalyst, obtained from a mixture of equal parts of nickel carbonate and kieselguhr by 7 hours' treatment with hydrogen at 500° C., the product is hydrogenated in an autoclave with hydrogen under a pressure of 15 atmospheres at 80° C. As soon as the absorption of hydrogen is terminated, the still hot solution is filtered from the catalyst and precipitated with dilute acid.

4 - phenyl - ethyl - dihydro-resorcinol forms colorless crystals melting at 126° C., it is difficultly soluble in water, easily soluble in soda and in organic solvents. The calcium salt is difficultly soluble in water. The yield is 95% of the theoretical quantity.

*Example 2*

192 parts by weight of 4-hexyl-resorcinol are dissolved in 400 parts by weight of a 10% solution of sodium hydroxide. 2 parts by weight of nickel in the form of a nickel catalyst, obtained according to Kelber (Berichte der Deutschen Chemischen Gesellschaft, vol. 49, 1916, page 55 and 60 last paragraph), are added and the product is hydrogenated at 90° C. with hydrogen under 20 atmospheres pressure. After assimilation of one molecule of hydrogen the reaction is terminated. The solution is liberated from the catalyst and poured into 1000 parts by weight of 9% acetic acid, whereby 4-hexyl-dihydro-resorcinol is precipitated.

After crystallization from dilute alcohol 4-hexyl-dihydro-resorcinol forms colorless leaflets, after crystallization from acetic acid coarse crystals melting at 64° C. It is difficultly soluble in water, easily soluble in soda solution and in organic solvents. The yield is 96% of the theoretical quantity.

*Example 3*

152 parts by weight of 4-propyl-resorcinol and 29 parts by weight of calcium oxide are hydrogenated with 400 parts by weight of water and 4 parts by weight of a nickel catalyst, obtained from a mixture of equal parts of nickel carbonate and kieselguhr by 7 hours' treatment with hydrogen at 500° C., in a pressure vessel at 80° C. with hydrogen at 15 atmospheres. When the assimilation of hydrogen is terminated, the product is filtered from the catalyst; to the filtrate dilute acid is added until it is slightly acid to Congo paper. The precipitated 4-propyl-dihydro-resorcinol is crystallized from alcohol or from acetic ester. The compound forms colorless crystals melting at 70° C.; it is difficultly soluble in water, easily soluble in organic solvents. The yield is 90% of the theoretical quantity.

*Example 4*

192 parts by weight of 4-cyclo-hexyl-resorcinol are dissolved in 600 parts by weight of a 7% solution of sodium hydroxide and hydrogenated as described in the foregoing examples. After having removed the catalyst by filtration, the reaction product is diluted with 600 parts by weight of alcohol and poured into 2000 parts by weight of a 5% sulphuric acid while stirring. After drying the powdery precipitate is recrystallized from acetic ester.

4-cyclo-hexyl-dihydro-resorcinol forms colorless crystals melting at 149° C.; it is difficultly soluble in water, easily soluble in organic solvents. The sodium salt is easily soluble in water. The yield is 90% of the theoretical quantity.

Example 5

138 parts by weight of ethyl-resorcinol and 28 parts by weight of calcium oxide are shaken together with 400 parts by weight of water and one part by weight of palladium (precipitated on charcoal) with hydrogen at atmospheric pressure. The assimilation of hydrogen begins slowly already at room temperature and is terminated by heating to 45–50° C. The catalyst is removed from the solution, the latter evaporated in vacuo to half its volume and precipitated with dilute acid at a temperature not higher than 5° C.

The 4-ethyl-dihydro-resorcinol forms colorless crystals melting at 109° C.; it is easily soluble in organic solvents and also to some degree soluble in water. The yield is 82% of the theoretical quantity.

Example 6

To 200 parts by weight of benzyl-resorcinol, 34 parts by weight of methylamine in 800 parts by weight of water 5 parts by weight of a nickel catalyst, prepared as described in Example 1, are added and treated at 80–90° C. with hydrogen of 15–20 atmospheres, until the assimilation of hydrogen is terminated. From the filtrate the 4-benzyl-dihydro-resorcinol is precipitated by acetic acid. It forms colorless crystals melting at 110° C., it is difficultly soluble in water, easily soluble in organic solvents. The yield is 96% of the theoretical quantity.

Example 7

To 20 parts by weight of benzyl-resorcinol 8 parts by weight of diethylamine in 200 parts by weight of water and 0.2 part by weight of platinum (precipitated on charcoal) are added and treated with hydrogen under a pressure of 5–10 atmospheres at 50° C. When the assimilation of hydrogen is terminated, the catalyst is removed by filtration and from the filtrate the benzyl-dihydro-resorcinol is precipitated with acid. The product is identical with the product of Example 6. The yield is 96% of the theoretical quantity.

I claim:

1. The 4-ethyl-dihydro-resorcinol, being a very reactive compound forming colorless crystals melting at 109° C,. easily soluble in organic solvents, difficultly soluble in water.

2. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of a strongly basic compound to catalytic hydrogenation.

3. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of a strongly basic compound to catalytic hydrogenation with metals of the 8th group of the periodical system as catalysts.

4. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of a strongly basic compound to catalytic hydrogenation with a nickel catalyst.

5. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of alkali to catalytic hydrogenation.

6. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of alkali to catalytic hydrogenation with metals of the 8th group of the periodical system as catalysts.

7. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of alkali to catalytic hydrogenation with a nickel catalyst.

8. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of sodium hydroxide to catalytic hydrogenation.

9. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of sodium hydroxide to catalytic hydrogenation with metals of the 8th group of the periodical system as catalysts.

10. The process for the manufacture of 4-R-dihydro-resorcinols (R representing an alkyl or arakyl group), which consists in subjecting solutions of 4-R-resorcinols (R representing an alkyl or aralkyl group) in the presence of at least one equivalent of sodium hydroxide to catalytic hydrogenation with nickel catalyst.

11. The process for the manufacture of 4-R-dihydro-resorcinols (R representing an alkyl or arakyl group), which consists in subjecting solutions of 4-R-resorcinols (R representing an alkyl or aralkyl group) in the presence of at least one equivalent of dialkylamine to catalytic hydrogenation.

12. The process for the manufacture of 4-R-dihydro-resorcinols (R representing an alkyl or aralkyl group), which consists in subjecting solutions of 4-R-resorcinols (R representing an alkyl or aralkyl group) in the presence of at least one equivalent of dialkylamine to catalytic hydrogenation with metals of the 8th group of the periodical system as catalysts.

13. The process for the manufacture of 4-R-dihydro-resorcinols (R representing an alkyl or aralkyl group), which consists in subjecting solutions of 4-R-resorcinals (R representing an alkyl or aralkyl group) in the presence of at least one equivalent of dialkylamine to catalytic hydrogenation with a nickel catalyst.

14. The process for the manufacture of 4-ethyl-dihydro-resorcinol, which consists in subjecting solutions of 4-ethyl-resorcinol in the presence of at least one equivalent of a strongly basic compound to catalytic hydrogenation.

15. The process for the manufacture of 4-ethyl-dihydro-resorcinol, which consists in subjecting solutions of 4-ethyl-resorcinol in the presence of at least one equivalent of a strongly basic compound to catalytic hydrogenation with metals of the 8th group of the periodical system as catalysts.

16. The process for the manufacture of 4-ethyl-dihydro-resorcinol, which consists in subjecting solutions of 4-ethyl-resorcinol in the presence of at least one equivalent of a strongly basic compound to catalytic hydrogenation with a nickel catalyst.

17. The process for the manufacture of 4-ethyl-dihydro-resorcinol, which consists in subjecting solutions of 4-ethyl-resorcinol in the presence of at least one equivalent of alkali to catalytic hydrogenation.

18. The process for the manufacture of 4-ethyl-dihydro-resorcinol, which consists in subjecting solutions of 4-ethyl-resorcinol in the presence of at least one equivalent of alkali to catalytic hydrogenation with metals of the 8th group of the periodical system as catalysts.

19. The process for the manufacture of 4-ethyl-dihydro-resorcinol, which consists in subjecting solutions of 4-ethyl-resorcinol in the presence of at least one equivalent of alkali to catalytic hydrogenation with a nickel catalyst.

20. The process for the manufacture of 4-ethyl-dihydro-resorcinol, which consists in subjecting solutions of 4-ethyl-resorcinol in the presence of at least one equivalent of sodium hydroxide to catalytic hydrogenation.

21. The process for the manufacture of 4-ethyl-dihydro-resorcinol, which consists in subjecting solutions of 4-ethyl-resorcinol in the presence of at least one equivalent of sodium hydroxide to catalytic hydrogenation with metals of the 8th group of the periodical system as catalysts.

22. The process for the manufacture of 4-ethyl-dihydro-resorcinol, which consists in subjecting solutions of 4-ethyl-resorcinol in the presence of at least one equivalent of sodium hydroxide to catalytic hydrogenation with a nickel catalyst.

23. The process for the manufacture of 4-ethyl-dihydro-resorcinol, which consists in subjecting solutions of 4-ethyl-resorcinol in the presence of at least one equivalent of dialkylamine to catalytic hydrogenation.

24. The process for the manufacture of 4-ethyl-dihydro-resorcinol, which consists in subjecting solutions of 4-ethyl-resorcinol in the presence of at least one equivalent of dialkylamine to catalytic hydrogenation with metals of the 8th group of the periodical system as catalysts.

25. The process for the manufacture of 4-ethyl-dihydro-resorcinol, which consists in subjecting solutions of 4-ethyl-resorcinol in the presence of at least one equivalent of dialkylamine to catalytic hydrogenation with a nickel catalyst.

MAX KLINGENFUSS.